Aug. 4, 1970 C. L. HEFLIN ET AL 3,522,468

IMAGE ORTHICON COMPRISING CATHODE, CONTROL GRID, AND TARGET SERIALLY CONNECTED BY INTERNAL RESISTANCES

Filed Nov. 1, 1967

INVENTORS
CHESTER L. HEFLIN
ARTHUR H. MENGEL

BY B. T. Wobensmith 2nd

ATTORNEY

United States Patent Office 3,522,468

Patented Aug. 4, 1970

3,522,468

IMAGE ORTHICON COMPRISING CATHODE, CONTROL GRID, AND TARGET SERIALLY CONNECTED BY INTERNAL RESISTANCES

Chester L. Heflin, Schwenksville, and Arthur H. Mengel, Pottstown, Pa. (both % Teltron, Inc., Box 131, Boyertown, Pa. 19512)

Filed Nov. 1, 1967, Ser. No. 679,888
Int. Cl. H01j *29/96, 31/36*
U.S. Cl. 315—3 1 Claim

ABSTRACT OF THE DISCLOSURE

Image orthicon television tubes having circuitry which provides for maintaining the scanning beam current at a constant value which results in a reduction of noise level, longer tube life and improved performance. The circuitry involves a departure from prior circuitry and includes providing resistors of fixed value between the electron gun control grid and ground of that grid and the thermionic cathode and that cathode to the target whereby the target will be bombarded evenly with no oversaturation throughout low to high light level operation.

BACKGROUND OF THE INVENTION

Field of the invention

This invention relates to an image orthicon tube having improved circuitry so as to maintain the scanning beam current at a constant value.

Description of the prior art

The operation of image orthicon tubes requires an ability to reproduce the image over a wide range of illumination and distance. This necessitates a strong scanning beam to reproduce the image on the target at high light levels but not so strong that the target is overdriven at low light levels. The previously available circuits have largely ignored low level operation and the attendant noise which is present in the tubes with these circuits, in order to have efficient high level operation. These circuits required a constant balancing of beam current by external adjustment in order not to damage the target and to obtain a satisfactory image. The present invention reduces low level noise, reduces external camera circuitry and adjustment, whereby a constant controlled beam current output is attained which is suitable for all light levels of operation.

SUMMARY OF THE INVENTION

The principal object of the present invention is to provide an image orthicon tube having circuitry for automatic beam compensation whereby the magnitude of scanning beam current is kept constant thereby reducing random fluctuation and consequent noise.

A further object of the present invention is to provide an image orthicon tube having automatic beam compensation whereby the target is adequately discharged at both low and high light levels.

A further object of the present invention is to provide an image orthicon tube having automatic beam compensation whereby it is impossible to overdrive the target with excess beam current thereby reducing target degradation and increasing target life.

A further object of the present invention is to provide an image orthicon tube having automatic beam compensation whereby lateral leakage causing black noise is minimized.

A further object of the present invention is to provide an image orthicon tube having automatic beam compensation whereby the scanning beam maintains a more constant relationship with the target which results in the scanning beam attaining a more orthogonal landing on the target.

A further object of the present invention is to provide an image orthicon tube with no electron gun control grid voltage and no target voltage, this resulting in a reduction in external circuitry and the resultant expected adjustment thereof.

Other objects and advantages features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
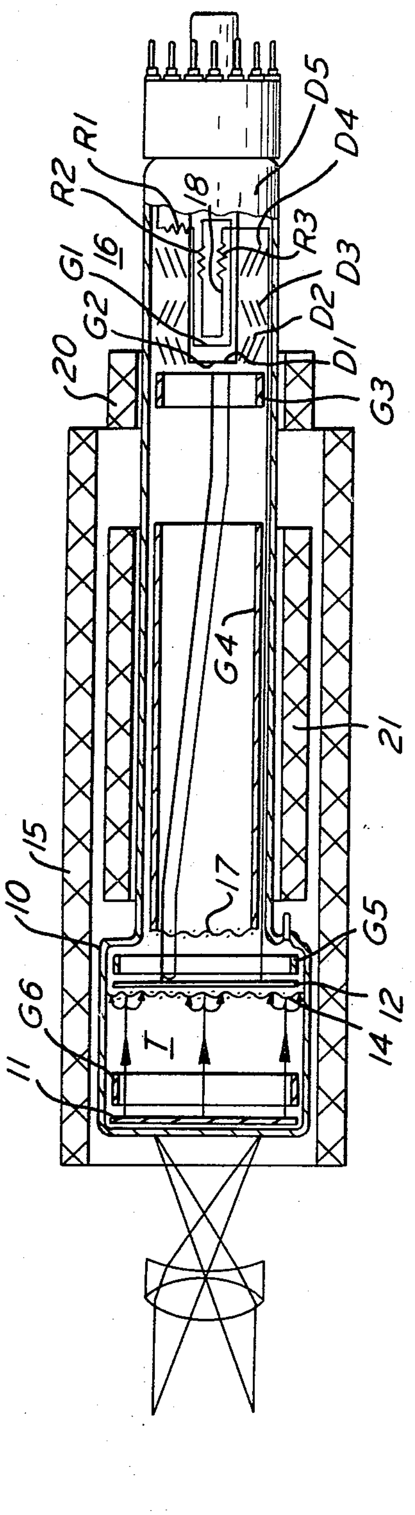
FIG. 1 is a longitudinal sectional view of a representative image orthicon tube in accordance with the invention and illustrating its component parts.
Figure 2:
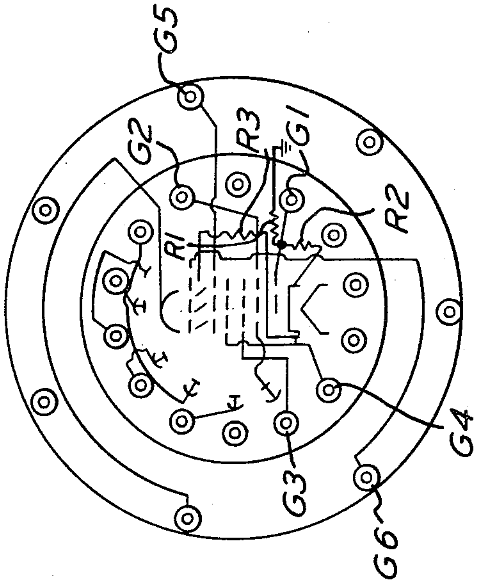
FIG. 2 is an end view, enlarged and partly diagrammatic, showing the socket portion of the tube of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings an image orthicon tube is there illustrated in accordance with the invention and which has an image section, a scanning section and a multiplier section of well known type, all enclosed in a glass envelope 10.

The image section contains a semi-transparent photocathode 11 located at the front and on the inside of the envelope 10, a metallic grid G6 which is inwardly adjacent the photocathode 11 to provide an electrostatic accelerating field, and a target T which consists of a glass disc 12 with a fine mesh wire screen 14 in closely spaced relation on the photocathode side. The glass disc 12 is sufficiently thin to permit electron charges to pass therethrough even though it is an insulating material. An external coil 15 is positioned outside the envelope 11 to provide a magnetic field which in conjunction with varying the photocathode voltage in a well known manner permits of focusing the image on the target T.

The light image from the scene to be televised is focused onto the photocathode 11 by an appropriate and if desired conventional optical system (not shown) and will be translated into an electron image by the photoelectrons emitted from the photocathode which are directed toward the target T by the combined electrostatic and electromagnetic focusing system described above. The photoelectrons from the photocathode 11 are emitted in direct proportion to the light intensity which has been reflected onto the photocathode 11 by the optical system (not shown) from various parts of the scene, and by reason of the electrostatic magnetic focusing grid G6 and coil 15, these electrons approach the target T in an array unchanged from that on the photocathode 11. The electrons leaving the photocathode 11 have a large range of velocities varying substantially in speed and direction, which requires a magnetic focusing field to swing these off-axis electrons into a helical beam for proper registration on the target T. Focusing of the electron image is achieved when the photocathode voltage is adjusted so that the individual electrons will exactly achieve one complete helix as they travel from photocathode 11 to target T so they come back to the same angular position on target T as they left photocathode 11.

When the photoelectrons are accelerated so as to bombard the thin glass disc 12, secondary electrons are excited at the surface. As the accelerating voltage of the primary electrons (or photoelectrons) is increased, a voltage is reached such that the number of secondary electrons leaving the disc 12 is exactly equal to the number of primary electrons arriving at it. At this particular value of voltage, the ratio of primary to secondary electrons is equal to unity, and the potential at which this occurs is called the first crossover potential. When the electrons are accelerated towards the disc 12 by potentials which are under the first crossover potential, the disc 12 will tend to be negative until it reaches an equilibrium potential, which is approximately equal to cathode potential. Once it has come to this equilibrium potential, no further electrons can reach the disc 12 since the electrons leaving the photocathode 11 would be moving against a retarding electric field. Similar considerations show that if disc 12 is bombarded above the first crossover potential, that is, under circumstances where more electrons leave the disc 12 than come to it, the disc 12 will become more positive. The equilibrium potential, that is to say the final potential which the disc 12 should reach, will be collector potential. Collector potential is the potential of the positive element in the tube to which secondary electrons are attracted. The disc 12 cannot reach any value higher than collector potential since electrons from the target disc 12 would have to travel against a retarding field to reach the collector under these conditions and would return to the target T, with a velocity less than the crossover, thereby driving the target negative until equilibrium is reached. Velocity of the secondaries are ignored in these considerations.

Therefore, in accordance with the above basic principles of secondary emission, it can be seen that if electrons leaving the photocathode 11 are energized above the crossover potential as they approach the target T, the photocathode side of the target T will be charged positively by signal information from the photocathode 11.

The target structure and specifically the disc 12 is scanned by an electron scanning beam from the scanning section which is described below and if the scanning beam is kept below first crossover potential, it will tend to charge any element of the target T being scanned towards photocathode potential.

The target structure above described has the advantage of storage. Information coming from a raster element on the photocathode 11 is written on the photocathode side of the disc 12 of the target T by the electrons from photocathode 11 continually during frame time. Therefore, the voltage on the target section corresponding to a scene element of information builds up continuously during frame time even though this information is used for only a fraction of a microsecond during the scanning operation.

The image is written by photoelectrons on the writing side of the disc 12. The voltage of this side increases in proportion to the intensity of the image. At the same time, the potential of corresponding elements on the reading side of the disc 12 increases to a corresponding potential by conduction through the glass disc 12.

It has been noted that some amplification occurs at the target T due to the high secondary emission ratio of the writing side of the target. Thus for each writing electron that lands in the writing of the image, of the order of five electrons are effective in writing information on the target T. This is the potential seen by the beam during scanning. Since this potential is now positive relative to the target equlibrium potential, scanning beam electrons are now able to land. The number of electrons subtracted from the scanning beam essentially constitutes the video signal. When the scanning side of the disc 12 is brought to cathode potential during scanning, the writing side of the disc 12 is capacity coupled to the mesh 14, therefore it will not drop all the way down to the equilibrium potential as is desired. For this reason it is necessary that the glass disc 12 of the target have sufficient conductivity to permit current flow to take place to bring both sides of the disc 12 to the same potential within frame time. On the other hand the disc 12 must not be overly conductive to prevent leakage of information laterally, as this results in deterioration of image sharpness.

The scanning section of the tube consists essentially of an electron gun 16 producing a very fine beam and a focusing system which is made up of dynodes D1, D2, D3, D4 and D5 control grid G1, accelerating grid G2, collector grid G3, focusing grid G4 and a decelerating grid G5. The electron gun 16 is composed of a thermionic cathode 18 and the control grid G1. The amount of beam current being used to scan the glass disc 12 is controlled by grid G1 adjacent to the thermionic cathode 18 of the electron gun 16. The beam is aligned with respect to the target T by the use of a transverse magnetic field produced by an alignment coil 20 and a horizontal and vertical coil 21. Proper focusing of the beam as it scans target disc 12 is accomplished by use of the alignment coil 20, the focusing grids G4 and G5 and the magnetic focusing coil 21. The beam as it leaves the gun section has been brought to the desired velocity say to a 300 volt velocity, its speed is then reduced by decelerator electrode grid G5 and field mesh screen 17 which are designed to reduce the speed of the beam to insure orthogonal landing on disc 12. The beam just comes to zero velocity as it approaches the disc 12 of the target T. That portion of the beam which is not used to bring areas of the disc 12 having signal information to zero potential is reflected by the focusing arrangements and brought back to a dynode D1 of the multiplier section.

The multiplier section is illustrated as a typical five stage electrostatically focused multiplier wherein the secondary emission of the dynodes are used to amplify the electron beams. The signal reaching dynode D1 is modified by each successive dynode, D2, D3, D4 and D5 until it has been amplified some 500 times.

The focusing arrangement of the tube is such that dynode D1 is scanned during normal scanning of the target T. The potentials of grids G3, G4 and G5 are adjusted to minimize dynode pattern imperfections yet keep the image in proper form. Noise, that is random fluctuations in the scanning beam from the electron gun 16, is proportional to the square root of the current magnitude. For modes of operation of the tube which involve low light levels it is possible for beam noise to become large relative to the signal. For this reason, for low level operation it is desirable to decrease beam current magnitude and maintain it at a constant value in order to get optimum signal from the standpoint of low noise while maintaining the ability to adequately discharge the image on the disc 12.

In order to decrease this beam current and maintain it at a constant value while remaining at a level that will bring the target to zero potential at various light levels, a resistance R1 of fixed value is inserted between the grid G1 to ground connection, a resistance R2 of fixed value is inserted between the thermionic cathode 18 connection and grid G1 connection, and a resistance R3 of fixed value is inserted between the cathode 18 and the target T.

Therefore as the thermionic cathode 18 is heated electrons begin to flow from the ground potential through the resistance R1 to grid G1, then through the resistance R2 to the cathode 18 and through resistance R3 to the target T.

Current flow in the resistance R2 sets up a positive potential on the cathode 18 in direct proportion to the current flow. Therefore additional current flow will bring the cathode 18 to a more positive potential in respect to grid G1, reducing the electron emission from the thermionic cathode 18 and maintaining a constant beam current. The grid G1 to ground resistance R1 lowers the beam current by a small percentage. The cathode 18 to target T resistance R3 has a small current flow therein which maintains the necessary voltage difference and enables the relationship to remain at a useful value.

Thus when the cathode 18 is negative in respect to the target T electrons will land on the target enabling the image pattern to be discharged and excess electrons are reflected back into the dynode D1 of the multiplier section.

Oversaturation of the target T from the scanning beam is therefore impossible under these conditions.

As a result target life is vastly extended, the signal is free from distortion and external circuitry heretofore needed to maintain the relative differences between the grid G1, the cathode 18 and the target T is eliminated. The necessity for constant manual adjustment of these voltages which was previously required is also eliminated.

It will thus be seen that structure has been provided to attain the objects of the invention.

We claim:

1. An image orthicon tube having an envelope containing an image section including a photocathode and a target upon which electrons from said photocathode are directed, a scanning section with a current controlled electron gun having a thermionic cathode and a multiplier section, said thermionic cathode having a control grid and an input to said cathode, said multiplier section comprising a series of dynodes capable of electron amplification, and means for maintaining the current input to said cathode at a constant value, said means comprising a plurality of resistances of fixed value interiorly disposed with respect to said envelope, said resistances being directly connected respectively between said control grid and said ground, said control grid and said cathode and said cathode and said target, the direct current potentials on said cathode, control grid, and target being determined solely by said resistances.

References Cited

UNITED STATES PATENTS

| | | | |
|---|---|---|---|
| 2,226,996 | 12/1940 | Schlesinger | 315—3 X |
| 2,407,485 | 9/1946 | Essig. | |
| 2,771,566 | 11/1956 | Baracket | 315—46 X |
| 2,987,645 | 6/1961 | Hudgons | 315—11 |
| 3,015,749 | 1/1962 | Francken | 315—3 |

ROBERT SEGAL, Primary Examiner

U.S. Cl. X.R.

178—7.2; 313—65; 315—10, 12